United States Patent [19]
Yasutake et al.

[11] Patent Number: 5,668,978
[45] Date of Patent: Sep. 16, 1997

[54] APPARATUS AND METHOD FOR SYNTHESIZING PROGRAM SPECIFICATION FROM INDEPENDENT SETS OF TABLES

[75] Inventors: Kouichi Yasutake, Kyoto; Norio Sanada, Kobe, both of Japan

[73] Assignee: Matsushita Electric Industrial Co., Ltd., Osaka, Japan

[21] Appl. No.: 520,227

[22] Filed: Aug. 28, 1995

Related U.S. Application Data

[63] Continuation of Ser. No. 148,938, Nov. 8, 1993, abandoned.

[30] Foreign Application Priority Data

Nov. 9, 1992 [JP] Japan ................................ 4-298768

[51] Int. Cl.[6] ........................................... G06F 9/00
[52] U.S. Cl. ............................................... 395/500
[58] Field of Search ........................ 395/500, 600, 395/700, 680

[56] References Cited

U.S. PATENT DOCUMENTS

| | | | |
|---|---|---|---|
| 4,799,141 | 1/1989 | Drusinsky et al. | 364/141 |
| 5,202,996 | 4/1993 | Sugino et al. | 395/700 |
| 5,228,040 | 7/1993 | Agrawal et al. | 371/22.1 |
| 5,301,100 | 4/1994 | Wagner | 364/148 |
| 5,339,395 | 8/1994 | Pickett et al. | 395/325 |
| 5,475,388 | 12/1995 | Gormish et al. | 341/107 |

FOREIGN PATENT DOCUMENTS 0501781  2/1992  European Pat. Off. .

OTHER PUBLICATIONS

Using statecharts for hardware description and synthesis by Drusinsky et al., 1989 IEEE publication, pp. 798–807.

Global scheduling independent of control dependencies based on condition vector by Wakabayashi et al., 1992 IEEE publication, pp. 112–115.

State assignment using Input/Output functions by Pomeranz et al., 1992 IEEE publication, pp. 573–577.

Wagner, F. "VFSM Executable Specification", May 1992, pp. 226–231.

Yuang, Maria. "Survey of Protocol Verification Techniques Based on Finite State Machine Models." 1988, pp. 164–172.

Shiratori et al. "A User Friendly Software Environment for Protocol Synthesis." 1991, pp. 477–480.

*Primary Examiner*—William M. Treat
*Assistant Examiner*—Zarni Maung
*Attorney, Agent, or Firm*—Price, Gess & Ubell

[57] ABSTRACT

Disclosed is an apparatus and method for synthesizing a plurality of program component specifications into a single program component specification. Each program component transforms its state in operation, responding to an input of an event and in turn outputs another event in accordance with the transformation to the other program components.

The program component specifications each includes a table showing events to be inputted therein, a table showing states of the program component in operation, a table showing state transformations in response to the input events, and a table showing events to be outputted therefrom according to the state transformations.

7 Claims, 5 Drawing Sheets

Fig.3 program component α

| input events | |
|---|---|
| a1 | |
| b1 | |

301

| states | |
|---|---|
| A1 | |
| B1 | |

302

303

| | | states | |
|---|---|---|---|
| | | A1 | B1 |
| input events | a1 | B1 | × |
| | b1 | × | A1 |

304

| | | states | |
|---|---|---|---|
| | | A1 | B1 |
| input events | a1 | a2 ¦ β | × |
| | b1 | × | c2 ¦ β | program component β

| input events | |
|---|---|
| a2 | |
| b2 | |
| c2 | |

305

| states | |
|---|---|
| A2 | |
| B2 | |
| C2 | |

306

307

| | | states | | |
|---|---|---|---|---|
| | | A2 | B2 | C2 |
| input events | a2 | B2 | A2 | × |
| | b2 | × | C2 | A2 |
| | c2 | B2 | × | × |

308

| | | states | | |
|---|---|---|---|---|
| | | A2 | B2 | C2 |
| input events | a2 | b1 ¦ α | a1 ¦ α | × |
| | b2 | × | a1 ¦ α | a1 ¦ α |
| | c2 | b1 ¦ α | × | × |

Fig.4

| input events | |
|---|---|
| | 401 |
| a1 | |
| b1 | |
| a2 | |
| b2 | |
| c2 | |

| states | |
|---|---|
| | 402 |
| A1,A2 | |
| A1,B2 | |
| A1,C2 | |
| B1,A2 | |
| B1,B2 | |
| B1,C2 | |

403

| | | states | | | | | |
|---|---|---|---|---|---|---|---|
| | | A1,A2 | A1,B2 | A1,C2 | B1,A2 | B1,B2 | B1,C2 |
| input events | a1 | A1,B2 | B1,A2 | B1,C2 | ✕ | ✕ | ✕ |
| | b1 | ✕ | ✕ | ✕ | A1,B2 | A1,B2 | A1,C2 |
| | a2 | A1,B2 | A1,B2 | ✕ | A1,B2 | B1,A2 | ✕ |
| | b2 | ✕ | B1,C2 | A1,B2 | ✕ | B1,C2 | B1,A2 |
| | c2 | A1,B2 | ✕ | ✕ | A1,B2 | ✕ | ✕ |

404

| | | states | | | | | |
|---|---|---|---|---|---|---|---|
| | | A1,A2 | A1,B2 | A1,C2 | B1,A2 | B1,B2 | B1,C2 |
| input events | a1 | a2 : β<br>b1 : α<br>c2 : β | a2 : β<br>a1 : α | a2 : β | ✕ | ✕ | ✕ |
| | b1 | ✕ | ✕ | ✕ | c2 : β<br>b1 : α | c2 : β | c2 : β |
| | a2 | b1 : α | a1 : α<br>a2 : β<br>b1 : α<br>c2 : β | ✕ | b1 : α<br>c2 : β | a1 : α | ✕ |
| | b2 | ✕ | a1 : α<br>a2 : β | a1 : α<br>a2 : β<br>b1 : α<br>c2 : β | ✕ | a1 : α | a1 : α |
| | c2 | b1 : α | ✕ | ✕ | b1 : α<br>c2 : β | ✕ | ✕ |

5,668,978

APPARATUS AND METHOD FOR SYNTHESIZING PROGRAM SPECIFICATION FROM INDEPENDENT SETS OF TABLES

This is a continuation of application Ser. No. 08/148,938, filed on Nov. 8, 1993, now abandoned.

BACKGROUND OF THE INVENTION (1) Field of the Invention

The present invention relates to an apparatus and method for synthesizing a plurality of program component specifications into a single program component specification. Each program component transforms its state in operation responding to an input of an event and then outputs another event in accordance with the transformation to the other program components.

(2) Description of the Related Art

Systems for supporting program development by using a plurality of existing programs as components to improve the program development efficiency have been prevailing. In these systems, however, each program component specification must be modified to be compatible with one another, so that program developers are required to fully understand effects of one program component specification on the others.

Especially when program component specifications grow in number, their interrelation gets more and more complicated, and as the result, synthesizing those program components itself become pretty difficult.

SUMMARY OF THE INVENTION

In view of the foregoing problem, an object of this invention is to provide an apparatus and method for synthesizing a plurality of program component specifications into a single program component, which can be handled by program developers ignorant of effects of one program component specification on the others in the synthesis.

This object can be achieved by an apparatus for synthesizing a plurality of program component specifications into a single program component specification. Each of the program components transforms its state in operation responding to an input of an event and in turn outputs another event in accordance with the transformation to the other program components. This apparatus comprises a program component specification storing device for storing a plurality of program component specifications each including a table showing events to be inputted therein, a table showing states of the program component in operation, a table showing state transformations in response to the input events, and a table showing events to be outputted therefrom according to the state transformations; and a program component specification synthesizing device for synthesizing respective tables of the same kind into a single table for the single program component specification.

The above-mentioned program component specification synthesizing device may comprise the following units: an input event table synthesizing unit for synthesizing input event tables for the plurality of program component specifications into a single input event table for the single program component specification; a state table synthesizing unit for synthesizing state tables for the plurality of program component specifications into a single state table for the single program component specification; a state transformation table synthesizing unit for synthesizing state transformation tables for the plurality of program component specifications into a single state transformation table for the single program component specification; and an output event table synthesizing unit for synthesizing output event tables for the plurality of program component specifications into a single output event table for the single program component specification.

The input event table synthesizing unit may put all the input events for the plurality of program component specifications together as input events for the single program component specification.

The state table synthesizing unit may combine all the states for the plurality of program component specifications so as to complete a single state table for the single program component specification.

The state transformation table synthesizing unit may find how each of the states in the single state table is transformed in response to each of the input events appearing on the single input event table, by referring to the state transformation tables and the output event tables both for the plurality of program component specifications.

The output event synthesizing unit may find which one of the output events in the single output event table is outputted in accordance with each of the states appearing on the single state table, responding to each of the input events in the single input event table, by referring to the state transformation tables and the output event tables both for the plurality of program component specifications.

The above-mentioned apparatus may further comprise a retrieving device for retrieving the input event tables, the state tables, the state transformation tables, and the output event tables stored in the program component specification storing device. The retrieving device also outputs the retrieved input event tables to the input event table synthesizing unit, the retrieved state tables to the state table synthesizing unit, the retrieved state transformation tables to the state transformation table synthesizing unit, and the retrieved output event tables to the output event table synthesizing unit.

The object can be achieved also by a method for synthesizing a plurality of program component specifications into a single program component specification. Each of the plurality of program component specifications includes a table showing events to be inputted therein, a table showing possible states of the program component in operation, a table showing state transformations in response to the input events, and a table showing events to be outputted therefrom according to the state transformations. This method comprises the following steps.

A step of synthesizing input event tables for the plurality of program component specifications into a single input event table for the single program component specification.

Another step of synthesizing state tables for the plurality of program component specifications into a single state table for the single program component specification.

Further another step of synthesizing state transformation tables for the plurality of program component specifications into a single state transformation table for the single program component specification.

A final step of synthesizing output event tables for the plurality of program component specifications into a single output event table for the single program component specification.

The above-mentioned step of synthesizing the input event tables for the plurality of program component specifications into the single input event table may put all the input events for the plurality of program component specifications together as input events for the single program component specification.

The step of synthesizing state tables for the plurality of program component specifications into the single state table may combine all the states for the plurality of program component specifications so as to complete a single state table for the single program component specification.

The step of synthesizing state transformation tables for the plurality of program component specifications into the single state transformation table may find how each of the states in the single state table is transformed in response to each of the input events appearing on the single input event table, by referring to the state transformation tables and the output event tables both for the plurality of program component specifications.

The step of synthesizing output event tables for the plurality of program component specifications into the single output event table may find which one of the output events in the single output event table is outputted in accordance with each of the states appearing on the single state table, responding to each of the input events in the single input event table, by referring to the state transformation tables and the output event tables both for the plurality of program component specifications.

According to the apparatus and method of this invention, program developers can synthesize a plurality of program component specifications into a new single program component, without knowing the effects of one program component specification on the others. This allows these program developers to be freed from the conventional burden of learning the effects, and the new program component as synthesized can obtain a higher reliability.

This invention is perfectly suitable for domestic electric appliances, whose control programs are operated by changing their states and process, with events inputted through button operation and the like.

BRIEF DESCRIPTION OF THE DRAWINGS

These and other objects, advantages and features of the invention will become apparent from the following description thereof taken in conjunction with the accompanying drawings which illustrate a specific embodiment of the invention. In the drawings:

FIG. 3 shows tables depicting program component specifications to be synthesized according to the embodiment of this invention.

FIG. 4 shows tables depicting a single program component specification as synthesized according to the embodiment of this invention.

DESCRIPTION OF THE PREFERRED EMBODIMENT

The apparatus for synthesizing a plurality of program component specifications into a single program component specification according to this embodiment will be described with reference to drawings.

Figure 1:
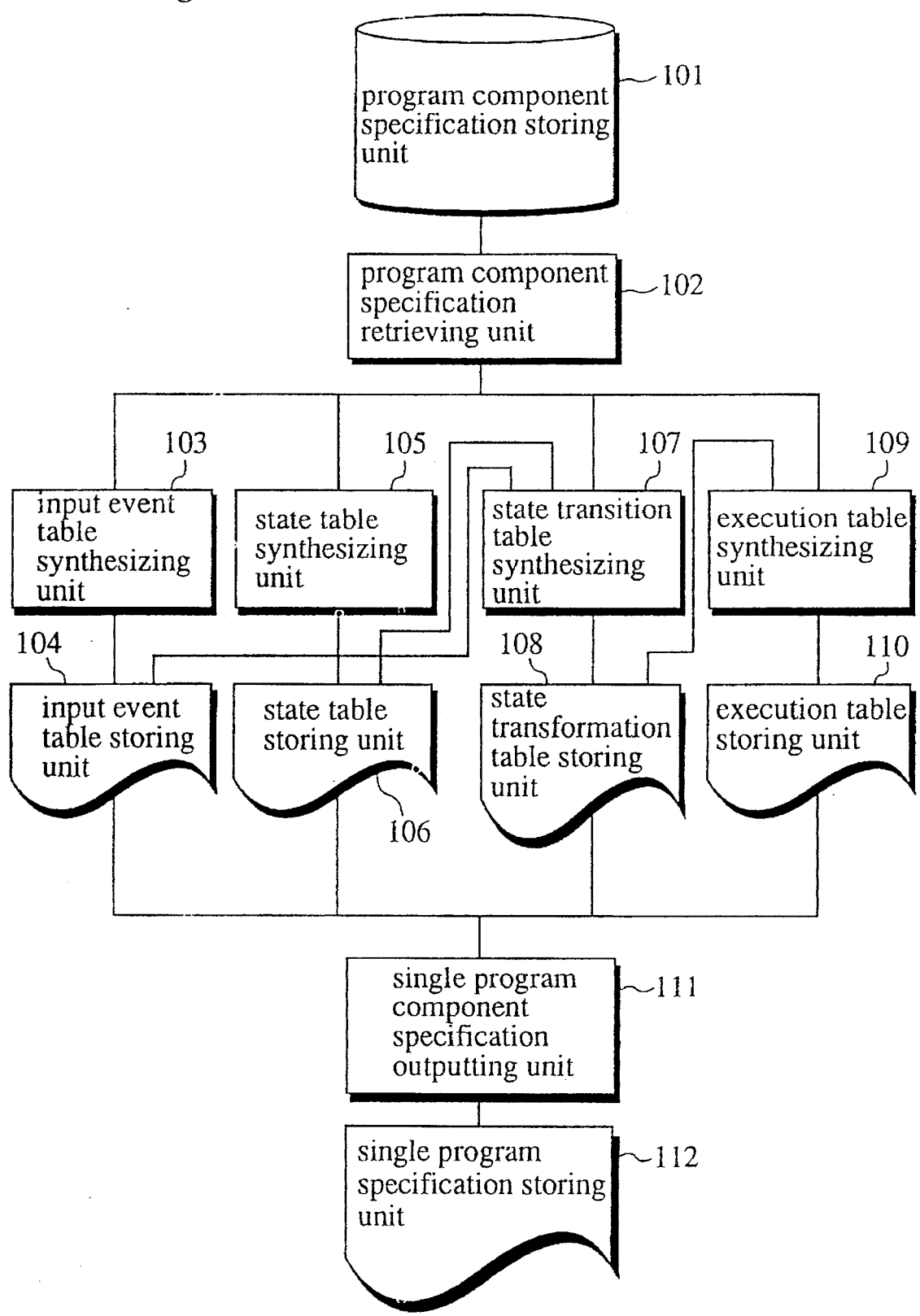
FIG. 1 is a block diagram showing the construction of an apparatus for synthesizing program component specifications into a single program component according to an embodiment of this invention.

In FIG. 1, a program component specification storage unit 101 stores program component specifications consisting of the following, which are originally registered therein: input event tables showing event to be inputted to program components (hereinafter referred to as input events), state tables showing possible states of the program components in operation, state transformation tables showing how these states are transformed by the input events, and execution tables showing both events to be outputted responding to the transformation and destinations of the events to be outputted.

A program component specification retrieving unit 102 retrieves program component specifications to be synthesized among all the program component specifications stored in the program component specification storage unit 101.

An input event table synthesizing unit 103 synthesizes all the input event tables retrieved by the program component specification retrieving unit 102 into a single input event table for the single program component specification as synthesized.

An input event storing unit 104 stores the single input event table synthesized by the input event synthesizing unit 103.

A state synthesizing unit 105 synthesizes all the states of the program components in operation retrieved by the program component specification retrieving unit 102 into a single state table for the single program component specification as synthesized.

A state storing unit 106 stores the single state table synthesized by the state synthesizing unit 105.

A state transformation table synthesizing unit 107 synthesizes the state transformation tables into a single state transformation table for the single program component specification, by referring to the state transformation tables and the execution tables both retrieved by the program component specification retrieving means 102.

A state transformation table storing unit 108 stores the single state transformation table synthesized by the state transformation table synthesizing unit 107.

An execution table synthesizing unit 109 synthesizes all the execution tables retrieved by the program component specification retrieving unit 102 into a single execution table for the single program component specification.

An execution table storing unit 110 stores the single execution table synthesized by the execution table synthesizing unit 109.

A program component specification outputting unit 111 outputs, as a single program component specification, every table stored in the input event table storing unit 104, in the state storing unit 106, in the state transformation table storing unit 108, and the execution table storing unit 110.

A single program component specification storing unit 112 stores the single program component specification outputted by the single program specification outputting unit 111.

Figure 2:
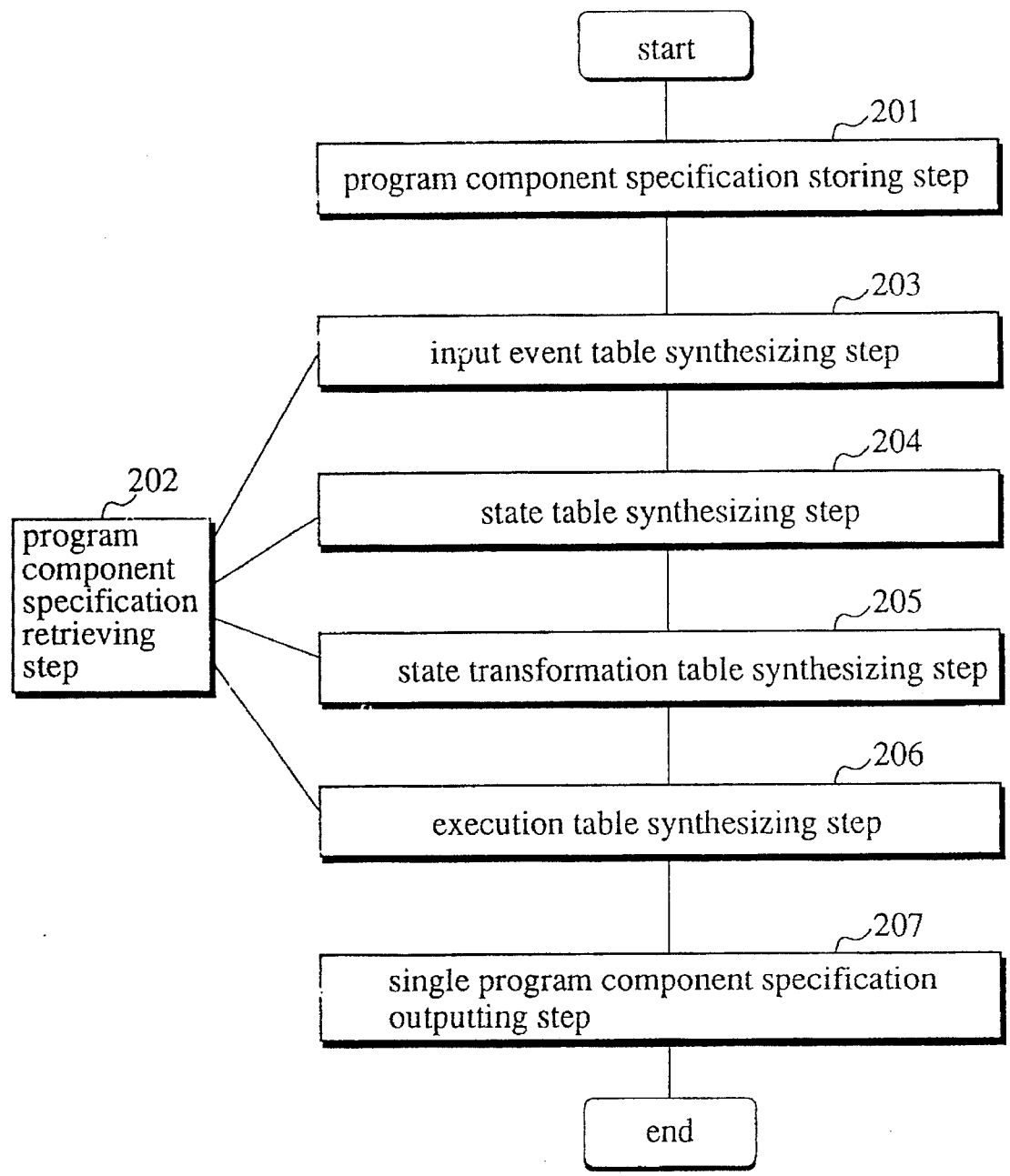
FIG. 2 is a flowchart depicting the method for synthesizing program component specifications into a single program component according to the embodiment of this invention.

As shown in the flowchart of FIG. 2, the method for synthesizing a plurality of program component specifications into a single program component specification according to this embodiment consists of the following steps:

a step 201 of storing program component specifications that an operator commands to synthesize;

a step 202 of retrieving the program component specifications stored in the step 201;

a step 203 of putting all the input event tables retrieved in the step 202 together as a single input event table for the single program component specification;

a step 204 of combining all the state tables retrieved in the step 202 as a single state table for the single program component specification;

a step 205 of completing a single state transformation table for the single program component specification by finding how each of the states appearing on the single state table combined in the step 204 is transformed, in response to each of the input events in the single input event table in the step 203, with reference to the state transformation tables and the output event tables for the program component specifications to be synthesized;

a step 206 of completing an execution table for the single program component specification by finding how each of the states in the single state table completed in the step 204 is transformed in response to each of the input events appearing on the single input event table, with reference to the state transformation tables and the output event tables both for the plurality of program component specifications; and a step 207 of outputting, as the single program component specification, all of the single input event table, the single state table, the single state transformation table, and the single execution table.

The following is an operational description of the apparatus for synthesizing a plurality of program component specifications into a single program component specification, constructed as above.

FIG. 3 shows specifications for program components α and β as examples to be stored in the program component specification storing unit 101 at the step of 201.

In FIG. 3, an input event table 301 shows all possible input events for the program component α.

A state table 302 shows all possible states for the program component α.

A state transformation table 303 shows current states of the program component α and transformed states in response to input events.

An execution table 304 shows all possible events to be outputted to the other program components in accordance with a state transformation.

Since tables 305–308 for the program component β correspond to the table 301–304 respectively, their explanation is not repeated.

Figure 5:
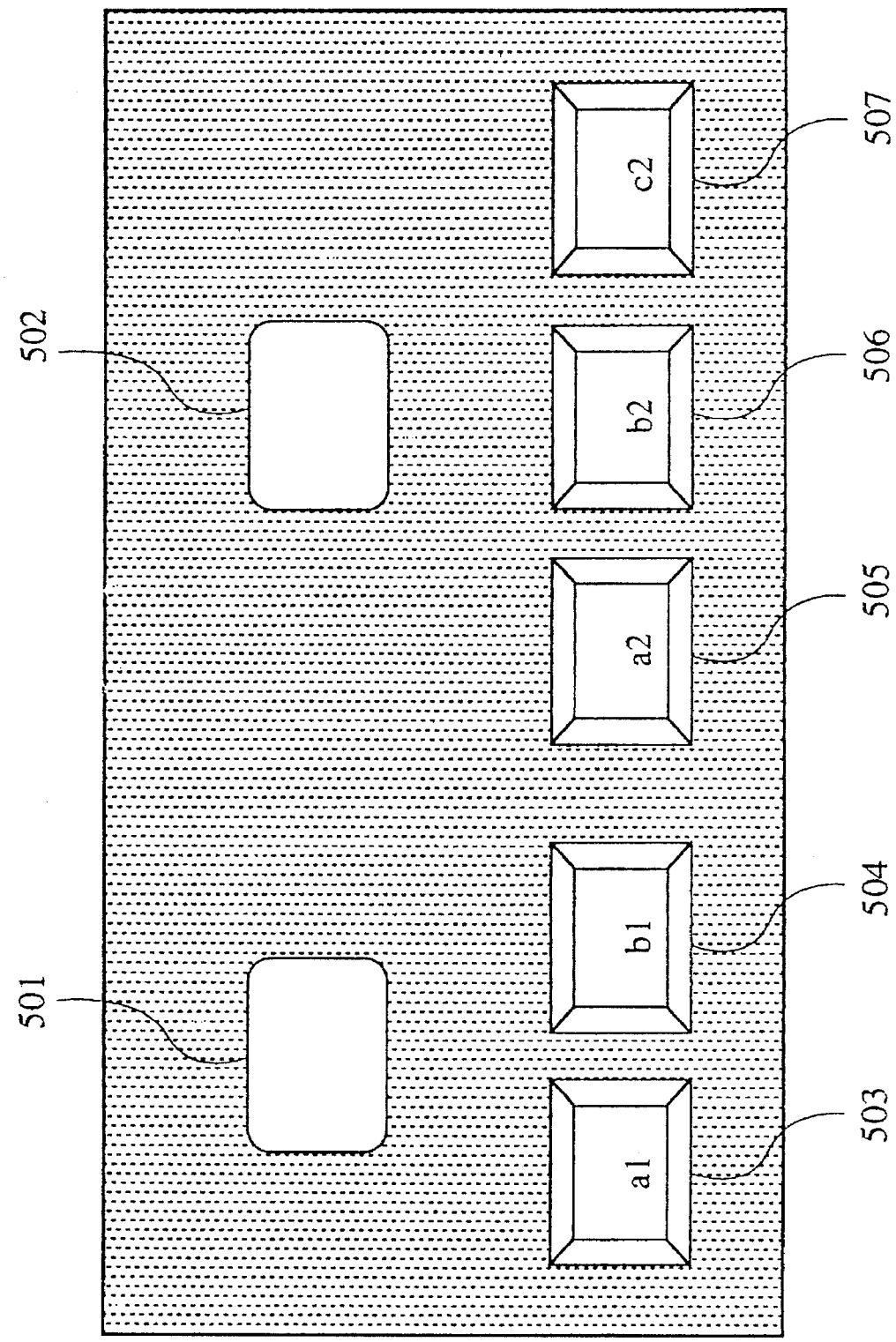
FIG. 5 shows an appliance to be controlled by a single program component as synthesized according to the embodiment of this invention.

FIG. 5 shows an applicant controlled by these program components α and β. The program component α controls a light emitting diode (LED) 501 and push-buttons 503 and 504. The LED 501 being on corresponds to the state A1 and being off to the state B1. When pushed, the push-buttons 503 and 504 respectively transmit input events a1 and b1 to the program component α.

The program component D controls an LED 502 and push-buttons 505, 506 and 507. The LED 502 changes its colors between red, blue, and yellow, responding to state A2, B2, and C2 respectively. When pushed, the push-buttons 505–507 respectively transmit input events a2, b2, and c2 to the program component β.

The following description is on the basis that the specifications for the two program components α and β are synthesized.

Synthesis of Input Events

The program component specification retrieving unit 102 retrieves the specifications of the program components α and β stored in the program component specification storing unit 101 (=step 202 in FIG. 2).

Then, the input event table synthesizing unit 103 synthesizes input event tables of the program components α and β retrieved by the program component specification retrieving unit 102 into a single input event table for a single program component specification. The input event table thus synthesized is stored to the input event table storing unit 104 (=step 203). Every input event included therein is listed on a table 401, which consists of the input events shown on the tables 301 and 305.

Synthesis of States in Operation

The state table synthesizing unit 105 synthesizes tables showing states of the program components α and β in operation retrieved by the program component specification retrieving unit 102 into a single state table for the single program component specification. The state table thus synthesized is stored to the state table storing unit 106 (=step 204). As shown in FIG. 4, the six states are listed on a table 402, which shows combinations between the two states shown on the table 302 and the three states on the table 306.

Synthesis of State Transformation

The state transformation table synthesizing unit 107 completes a state transformation table for the single program component specification by applying the state transformation tables 303 and 307 and the execution tables 304 and 308 to every combination between the input events in the table 401 and the states in the table 402 until final states for the single program component specification are determined.

The following are detailed procedures for the state table synthesizing unit 105 to complete the state transformation table in the case that an input event a1 is received when states (A1, B2) are combined.

Since the event a1 is for the program component α, the state transformation table 303 is retrieved by the program component specification retrieving unit 102. The state of the program component α is transformed from A1 to B1, and as a result, the state for the single program component specification becomes (B1, B2).

At the same time, the execution table 304 is retrieved by the program component specification retrieving unit 102. Since the event a2 is produced for the program component β, the state of the program component β is transformed from B2 to A2. As a result, the state of the single program component specification becomes (B1, A2).

Although the event a1 is also produced for the program component α, a state of the program component α is not transformed by the input event a1 as long as its state is B1. Accordingly, if the event a1 is received under the state of (A1, B2), the state of the single program component specification becomes (B1, A2).

Thus, the state transformation table synthesizing unit 107 completes transformation of each of the states in the table 402 in response to each of the input events in the table 401. Information on the state transformation thus completed is stored in the state transformation table storing unit 108 (=step 205). These results are shown in a state transformation table 403 in FIG. 4. This table 403 indicates how a current state for the single program component specification is transformed responding to an input event, with the input event table 401 as a vertical line and state table 402 as a horizontal line.

Synthesis of Execution

Responding to each state transformation in the state transformation table 403, the execution table synthesizing unit 109 retrieves all the events appearing on the execution table 304 and 308, and then registers the results in the execution table storing unit 110.

The following is a specified operation of the execution table synthesizing unit 109 in the case that the event a1 is received under the state of (A1, B2).

Since the event a1 is for the program component α, the state transformation table 303 is retrieved by the program component specification retrieving unit 102. The state of the program component α is transformed from A1 to B1, and as a result, the state of the single program component specification becomes (B1, B2). At the same time, the event a2 appearing on the execution table 304 is generated for the program component β. The execution table synthesizing unit 109 adds the event a2 to the events generated in accordance with this state transformation.

Since the event a2 is for the program component β, the execution table synthesizing unit 109 makes the program component specification retrieving unit 102 retrieve the state transformation table 307. As the result, the state of the program component β is transformed from B2 to A2, and the state for the single program component specification becomes (B1, A2). At the same time, the event a1 appearing on the execution table 308 is produced. The event a1 is added to the events generated in accordance with this state transformation. After this, no more events is generated because the state of the program component α is not transformed by the event a1 under the state of B1.

Accordingly, if the event a1 is received under the state of (A1, B2), events a2 and a1 will be generated. Thus, the execution table synthesizing unit 109 completes the state transformation of all the events generated responding to the state transformation of the single program component specification. Information on the generated events is stored in the execution table storing unit 110 (=step 206). The results are shown in an execution table 404 in FIG. 4. This table 404 indicates which event is outputted under a current state, responding to each input event, with the input event table 401 as a vertical line and state table 402 as a horizontal line.

The single program specification outputting unit 111 outputs, as the single program component specification, the input events in the input event table 401, the states in the state table 402, the state transformation in the state transformation table 403, and the execution in the execution table 404.

The following is a description of the single program component specification when the push-button 503 is pushed under the conditions that the LED 501 is on and the blue LED 502 is on.

The states that the LED 501 is on and the LED 502 exhibits blue right correspond to (A1, B2). If the push-button 503 is pushed under these conditions, the input event a1 is generated. According to the state transformation table 403, when the input event a1 is received under the states of (A1, B2), the state of the single program component specification becomes (B1, A2). As the result, the LED 501 is turned off and the LED 502 exhibits red light.

Although two program components are synthesized in the embodiment, more than two can be synthesized.

Although the present invention has been fully described by way of examples with reference to the accompanying drawings, it to be noted that various changes and modifications will be apparent to those skilled in the art. Therefore, unless otherwise such changes and modifications depart from the scope of the present invention, they should be construed as being included therein.

What is claimed is:

1. An apparatus for synthesizing a plurality of program component specifications into a single program component specification, each program component transforming its state in operation responding to an input of an event and, in turn, outputting another event in accordance with the transformation to the other program components, said apparatus comprising:

program component specification storing means for storing a plurality of program component specifications, each including a table showing events to be inputted therein, a table showing states of the program component in operation, a table showing state transformations in response to the input events, and a table showing events to be outputted therefrom to the other program components according to the state transformations;

input event table synthesizing means for synthesizing input event tables for the plurality of program component specifications into a single input event table for said single program component specification;

state table synthesizing means for synthesizing state tables for the plurality of program component specifications into a single state table for said single program component specification;

state transformation table synthesizing means for finding how each of the states in the single state table is transformed in response to each of the input events in the single input event table, by tracing paths of state transformation by referring to the state transformation tables and the output event tables, both for the plurality of program component specifications;

output event table synthesizing means for finding which one of the output events in the single output event table is outputted while each of the states is being transformed, and by responding to each of the input events in the single input event table, by referring to the state transformation tables and the output event tables, both for the plurality of program component specifications; and retrieving means for retrieving the input event tables, the state tables, the state transformation tables, and the output event tables stored in said program component specification storing means, and for outputting the retrieved input event tables to said input event table synthesizing means, the retrieved state tables to said state table synthesizing means, the retrieved state transformation tables to said state transformation table synthesizing means, and the retrieved output event tables to said output event table synthesizing means.

2. The apparatus of claim 1, wherein said input event table synthesizing means puts all the input events for the plurality of program component specifications together as input events for said single program component specification.

3. The apparatus of claim 2, wherein said state table synthesizing means combines all the states for the plurality of program component specifications so as to complete the single state table.

4. A method for synthesizing a plurality of program component specifications into a single program component specification, each of the plurality of program component specifications including a table showing events to be inputted therein, a table showing possible states of the program component in operation, a table showing state transformations in response to the input events, and a table showing events to be outputted therefrom to the other program components according to the state transformations, comprising the steps of:

synthesizing input event tables for the plurality of program component specifications into a single input event table for said single program component specification;

synthesizing state tables for the plurality of program component specifications into a single state table for said single program component specification;

finding how each of the states in the single state table is transformed in response to each of the input events in the single input event table, by tracing paths of state transformation by referring to the state transformation tables and the output event tables, both for the plurality of program component specifications; and finding which one of the output events in the single output event table is outputted while each of the states is being transformed, responding to each of the input events in the single input event table, by referring to the state transformation tables and the output event tables, both for the plurality of program component specifications.

5. The method of claim 4, wherein the step of synthesizing the input event tables for the plurality of program component specifications into the single input event table puts all the input events for the plurality of program component specifications together as input events for said single program component specifications.

6. The method of claim 5, wherein the step of synthesizing the state tables for the plurality of program component specifications into the single state table combines all the states for the plurality of program component specifications so as to complete the single state table.

7. An apparatus for synthesizing a plurality of program component specifications into a single program component specification, each program component transforming its state in operation responding to an input of an event and, in turn, outputting another event in accordance with the transformation to the other program components, said apparatus comprising:

program component specification storing means for storing a plurality of program component specifications, each including a table showing events to be inputted therein, a table showing states of the program component in operation, a table showing state transformations in response to the input events, and a table showing events to be outputted therefrom to the other program components according to the state transformations;

input event table synthesizing means for synthesizing input event tables for the plurality of program component specifications into a single input event table for said single program component specification;

state table synthesizing means for synthesizing state tables for the plurality of program component specifications into a single state table for said single program component specification;

state transformation table synthesizing means for finding how each of the states in the single state table is transformed in response to each of the input events in the single input event table, the state transformation table synthesizing means comprising:

selecting means for selecting the events one by one from the synthesized input event table;

tracing means for tracing a path of state transformations caused by the events selected by the selections means based on the retrieving by the retrieving means; and state determination means for outputting the last state of the traced path to the synthesized state transformation table;

output event table synthesizing means for finding which one of the output events in the single output event table is outputted while each of the states is being transformed, and by responding to each of the input events in the single input event table, by referring to the state transformation tables and the output event tables, both for the plurality of program component specifications, the output event table synthesizing means comprising:

output event detection means for detecting events that are outputted on the path traced by the tracing means; and output event determination means for outputting that last output event on the path to the synthesized output event table, wherein the tracing means traces based on the output events detected by the output event detection means;

retrieving means for retrieving the input event tables, the state tables, the state transformation tables, and the output event tables stored in said program component specification storing means, and for outputting the retrieved input event tables to said input event table synthesizing means, the retrieved state tables to said state table synthesizing means, the retrieved state transformation tables to said state transformation table synthesizing means, and the retrieved output event tables to said output event table synthesizing means.

* * * * *